(12) United States Patent
Krüger et al.

(10) Patent No.: US 11,607,073 B2
(45) Date of Patent: Mar. 21, 2023

(54) DEVICE FOR PRODUCING A BEVERAGE

(71) Applicant: FREEZIO AG, Amriswil (CH)

(72) Inventors: Marc Krüger, Bergisch Gladbach (DE); Günter Empl, Bergisch Gladbach (DE); Daniel Fischer, Romanshorn (CH)

(73) Assignee: FREEZIO AG, Amriswil (CH)

( * ) Notice: Subject to any disclaimer, the term of this patent is extended or adjusted under 35 U.S.C. 154(b) by 340 days.

(21) Appl. No.: 16/625,518

(22) PCT Filed: Jun. 26, 2018

(86) PCT No.: PCT/EP2018/067114
§ 371 (c)(1),
(2) Date: Dec. 20, 2019

(87) PCT Pub. No.: WO2019/002293
PCT Pub. Date: Jan. 3, 2019

(65) Prior Publication Data
US 2021/0137304 A1 May 13, 2021

(30) Foreign Application Priority Data

Jun. 26, 2017 (DE) ...................... 10 2017 210 727.8

(51) Int. Cl.
*A47J 31/40* (2006.01)
(52) U.S. Cl.
CPC ........... *A47J 31/407* (2013.01); *A47J 31/405* (2013.01)
(58) Field of Classification Search
CPC .............................. A47J 31/407; A47J 31/405
See application file for complete search history.

(56) References Cited

U.S. PATENT DOCUMENTS

| 4,314,768 A | 2/1982 | Goglio et al. |
| 4,323,171 A | 4/1982 | Whorton, III et al. |

(Continued)

FOREIGN PATENT DOCUMENTS

| CA | 2556421 C | 1/2013 |
| CN | 104703894 A | 6/2015 |

(Continued)

OTHER PUBLICATIONS

Supplemental Notice of Opposition dated Feb. 7, 2022, Application No. 18743400.6 (Patent No. 3644802).

(Continued)

*Primary Examiner* — Omar Flores Sanchez
(74) *Attorney, Agent, or Firm* — The Dobrusin Law Firm, P.C.; Daniela M. Thompson-Walters

(57) ABSTRACT

Proposed is a device for producing a beverage, more particularly a cold beverage, comprising a cartridge mount having a cartridge holder for holding a cartridge filled with a beverage substance, wherein: the cartridge holder has a receiving opening; the cartridge holder has a water supply for introducing water into the cartridge and a compressed air supply for introducing compressed air into the cartridge; the cartridge holder can be transferred between a loading position, in which the cartridge can be inserted into or removed from the receiving opening, and an operating position, in which a beverage can be produced in the cartridge and dispensed from a beverage outlet of the cartridge by the introduction of the water and the compressed air into the cartridge and by the interaction of the water with the beverage substance; the cartridge holder has a first holding element and a second holding element between which the receiving opening is formed; the first holding element is moveable in relation to the second holding element in order to transfer the cartridge holder from the loading position to (Continued)

the operating position or from the operating position to the loading position.

20 Claims, 7 Drawing Sheets

(56) References Cited

U.S. PATENT DOCUMENTS

| | | | |
|---|---|---|---|
| 4,376,496 A | 3/1983 | Sedam et al. | |
| 4,581,239 A | 4/1986 | Woolman | |
| 4,708,266 A | 11/1987 | Rudick | |
| 4,829,889 A | 5/1989 | Takeuchi | |
| 4,938,387 A | 7/1990 | Kervefors et al. | |
| 5,402,707 A | 4/1995 | Fond | |
| 5,435,462 A | 7/1995 | Fujii | |
| 5,494,194 A | 2/1996 | Topper et al. | |
| 5,836,482 A | 11/1998 | Ophardt | |
| 5,876,995 A | 3/1999 | Bryan | |
| 5,897,899 A | 4/1999 | Fond | |
| 6,079,315 A | 6/2000 | Beaulieu et al. | |
| 6,655,260 B2 | 12/2003 | Lazaris et al. | |
| 6,971,549 B2 | 12/2005 | Leifheit | |
| 7,597,922 B2 | 10/2009 | Cheng | |
| 8,596,498 B2 | 12/2013 | Werner | |
| 8,671,628 B2 | 3/2014 | Sighinolfi | |
| 8,807,018 B2 | 9/2014 | Doleac | |
| 10,407,291 B2 | 9/2019 | Kruger | |
| 11,021,358 B2 | 6/2021 | Kruger | |
| 2002/0007671 A1 | 1/2002 | Lavi | |
| 2002/0078831 A1 | 6/2002 | Cai | |
| 2002/0130140 A1 | 9/2002 | Cote | |
| 2002/0144603 A1 | 10/2002 | Taylor | |
| 2002/0193777 A1 | 12/2002 | Aneas | |
| 2003/0000964 A1 | 1/2003 | Schroeder et al. | |
| 2003/0036725 A1 | 2/2003 | Lavi | |
| 2003/0070554 A1 | 4/2003 | Cortese | |
| 2003/0097314 A1 | 5/2003 | Crisp, III et al. | |
| 2004/0188459 A1 | 9/2004 | Halliday | |
| 2004/0191372 A1 | 9/2004 | Halliday et al. | |
| 2005/0077318 A1 | 4/2005 | Macler | |
| 2005/0151764 A1 | 7/2005 | Grady | |
| 2005/0160919 A1 | 7/2005 | Balkau | |
| 2005/0269362 A1 | 12/2005 | Guerrero | |
| 2006/0047250 A1 | 3/2006 | Hickingbotham | |
| 2006/0138177 A1 | 6/2006 | Wauters et al. | |
| 2006/0174769 A1 | 8/2006 | Favre | |
| 2006/0249536 A1 | 11/2006 | Hartman et al. | |
| 2007/0175334 A1 | 8/2007 | Halliday | |
| 2007/0199453 A1 | 8/2007 | Rasmussen | |
| 2008/0029541 A1 | 2/2008 | Wallace et al. | |
| 2008/0302252 A1 | 12/2008 | O'Brien | |
| 2009/0145926 A1 | 6/2009 | Klopfenstein | |
| 2009/0183640 A1 | 7/2009 | Ozanne | |
| 2009/0199518 A1 | 8/2009 | Deuber | |
| 2009/0308488 A1 | 12/2009 | Bennett | |
| 2010/0064899 A1 | 3/2010 | Aardenburg | |
| 2010/0083843 A1* | 4/2010 | Denisart | A47J 31/3695 |
| | | | 99/295 |
| 2010/0107889 A1 | 5/2010 | Denisart | |
| 2010/0147154 A1 | 6/2010 | De Graaff | |
| 2010/0180774 A1 | 7/2010 | Kollep | |
| 2010/0206177 A1 | 8/2010 | Ricotti | |
| 2010/0282091 A1 | 11/2010 | Doleac | |
| 2011/0000377 A1 | 1/2011 | Favre | |
| 2011/0110180 A1 | 5/2011 | Snider | |
| 2011/0166910 A1 | 7/2011 | Marina et al. | |
| 2011/0210140 A1 | 9/2011 | Girard | |
| 2012/0052159 A1 | 3/2012 | Doleac | |
| 2012/0090473 A1 | 4/2012 | Deuber | |
| 2012/0121780 A1 | 5/2012 | Lai et al. | |
| 2012/0199011 A1 | 8/2012 | Cheng | |
| 2012/0199227 A1 | 8/2012 | Manser | |
| 2012/0207893 A1 | 8/2012 | Krüger | |
| 2012/0231124 A1 | 9/2012 | Kamerbeek | |
| 2013/0055903 A1 | 3/2013 | Deuber | |
| 2013/0061762 A1 | 3/2013 | Carr et al. | |
| 2013/0062366 A1 | 3/2013 | Tansey | |
| 2013/0084376 A1 | 4/2013 | Fischer | |
| 2013/0129870 A1 | 5/2013 | Novak | |
| 2013/0224340 A1 | 8/2013 | BenDavid | |
| 2013/0239817 A1* | 9/2013 | Starr | A47J 31/462 |
| | | | 99/280 |
| 2013/0239820 A1 | 9/2013 | Baldo | |
| 2013/0305932 A1* | 11/2013 | Epars | A47J 31/3633 |
| | | | 99/295 |
| 2013/0340626 A1 | 12/2013 | Oh | |
| 2014/0033934 A1 | 2/2014 | Chou | |
| 2014/0130678 A1 | 5/2014 | Frydman | |
| 2014/0227403 A1 | 8/2014 | Fischer | |
| 2014/0299000 A1 | 10/2014 | Hanneson et al. | |
| 2014/0326750 A1 | 11/2014 | Marina | |
| 2014/0335239 A1 | 11/2014 | Novak | |
| 2014/0338542 A1 | 11/2014 | Smith | |
| 2014/0345472 A1 | 11/2014 | Fritz | |
| 2015/0050392 A1 | 2/2015 | Stonehouse et al. | |
| 2015/0216353 A1 | 8/2015 | Polti | |
| 2015/0238039 A1 | 8/2015 | Fischer | |
| 2015/0266665 A1 | 9/2015 | Flick | |
| 2015/0335197 A1 | 11/2015 | Moon | |
| 2015/0360854 A1 | 12/2015 | Massey | |
| 2015/0374025 A1 | 12/2015 | Evans | |
| 2016/0015205 A1 | 1/2016 | Oh | |
| 2016/0068334 A1 | 3/2016 | Cafaro | |
| 2016/0152409 A1 | 6/2016 | Cafaro | |
| 2016/0272414 A1 | 9/2016 | Roberts | |
| 2016/0309948 A1 | 10/2016 | Dees | |
| 2016/0338527 A1 | 11/2016 | Burrows | |
| 2016/0367066 A1 | 12/2016 | Brandsma | |
| 2016/0367070 A1 | 12/2016 | Cable et al. | |
| 2017/0135516 A1 | 5/2017 | Fantappie | |
| 2018/0257856 A1 | 9/2018 | Oliver | |
| 2019/0016579 A1 | 1/2019 | Kruger | |
| 2019/0031485 A1 | 1/2019 | Kruger | |
| 2019/0127200 A1 | 5/2019 | Kruger | |
| 2019/0241421 A1 | 8/2019 | Kruger | |
| 2019/0248639 A1 | 8/2019 | Kruger | |
| 2021/0229874 A1 | 7/2021 | Cafaro | |

FOREIGN PATENT DOCUMENTS

| | | |
|---|---|---|
| DE | 69210084 T2 | 9/1996 |
| DE | 29825074 U1 | 9/2004 |
| DE | 102009049945 A1 | 4/2011 |
| DE | 102009052513 A1 | 5/2011 |
| EP | 0512470 B1 | 4/1996 |
| EP | 1559351 B1 | 1/2005 |
| EP | 1671568 A2 | 6/2006 |
| EP | 1806314 A1 | 7/2007 |
| EP | 2017219 A1 | 1/2009 |
| EP | 2017221 A1 | 1/2009 |
| EP | 2080454 A1 | 7/2009 |
| EP | 2374733 A1 | 10/2011 |
| EP | 2268175 B1 | 5/2013 |
| EP | 2603120 B1 | 6/2013 |
| EP | 2923772 A1 | 9/2015 |
| EP | 2750561 A1 | 3/2017 |
| GB | 1256247 A | 12/1971 |
| GB | 2020631 A | 11/1979 |
| GB | 2033333 A | 5/1980 |
| GB | 2416757 A | 2/2006 |
| JP | 2005211659 | 8/2005 |
| JP | 2006516398 A | 7/2006 |
| JP | 2008021294 A | 1/2008 |
| JP | 2013533070 A | 8/2013 |
| KR | 101219561 B1 | 2/2013 |
| KR | 101431858 B1 | 8/2014 |
| RU | 2346882 C2 | 1/2006 |
| TW | 201200433 A1 | 1/2012 |
| WO | 1996/036556 A1 | 11/1996 |
| WO | 98/05586 A1 | 2/1998 |
| WO | 01/21292 A1 | 3/2001 |
| WO | 2004067386 A | 8/2004 |
| WO | 2004/099060 A2 | 11/2004 |
| WO | 2005/079361 A2 | 9/2005 |

(56) References Cited

FOREIGN PATENT DOCUMENTS

| | | |
|---|---|---|
| WO | 2006/005401 A2 | 1/2006 |
| WO | 2007/035820 A2 | 3/2007 |
| WO | 2011/084603 A1 | 7/2011 |
| WO | 2011/138405 A1 | 11/2011 |
| WO | 2012/007293 A1 | 1/2012 |
| WO | 2013/036564 A2 | 3/2013 |
| WO | 2013/119534 A1 | 8/2013 |
| WO | 2013/119543 A1 | 8/2013 |
| WO | 2013114346 A2 | 8/2013 |
| WO | 2013139864 A1 | 9/2013 |
| WO | 2014/011324 A1 | 1/2014 |
| WO | 2014/200481 A1 | 12/2014 |
| WO | 2015056022 A1 | 4/2015 |
| WO | 2015/094774 A1 | 6/2015 |
| WO | 2017/121796 A1 | 7/2017 |

OTHER PUBLICATIONS

Japanese Office Action dated Feb. 1, 2022, Application No. 2019571440.
Korean Examination Report dated Jan. 28, 2022, Application No. 10-2020-7002431.
International Search Report for International Application PCT/EP2018/067114, dated Oct. 9, 2018.
Notification of Refusal for Japanese Patent Application No. 2019-362721, drafted Nov. 26, 2020 and dated Dec. 1, 2020.
Office Action and Notice of References Cited for U.S. Appl. No. 16/069,752 dated Jan. 7, 2021.

* cited by examiner

DEVICE FOR PRODUCING A BEVERAGE

FIELD

The present disclosure relates to a device for producing a beverage while using replaceable cartridges.

BACKGROUND

It is an object of the present invention to make available a device for producing a beverage while using replaceable cartridges, in which the loading and unloading of the device with cartridges is significantly simplified and thus offers the user an ease of operation that is increased in comparison to the devices of the generic type known from the prior art.

In principle, devices for producing a beverage by means of cartridges and corresponding cartridges are known from publication US 2004/191 372 A1. This publication discloses a coffee machine in which a coffee beverage is capable of being generated by a machine by means of a cartridge in which coffee granules are contained. To this end, the cartridge by a user is manually placed in a brewing chamber which can be swung open. Further devices for producing beverages by means of pre-portioned cartridges are known from publications US 2016/272 414 A1, US 2016/068 334 A1, US 2015/335 197 A1, and US 2011/210 140 A1.

SUMMARY

The object of the present invention is achieved by a device as claimed in claim 1.

The device according to the invention has the advantage that the cartridge is received in a receptacle opening that is accessible from outside the device. The receptacle opening herein is formed by two separate holding elements, wherein the first holding element is movable in relation to the other holding element. Simple inserting of the cartridge by a user is enabled in this way, while reliable fixing of the cartridge, in particular in a correct orientation, is at the same time guaranteed in the operating position. The cartridge mounting is easy to operate and by virtue of view movable parts is at the same time low-maintenance. Moreover, the inserting of the cartridge and the transferring from the loading position to the operating position are performed with short paths for the moving parts so that the overall time for preparing the beverage is advantageously minimized.

The explanations made in the context of this subject matter of the present invention also apply in analogous manner to the other subject matter of the present invention and vice versa.

The present invention relates to a device having a cartridge mounting which supports and/or guides the cartridge. The cartridge has a cavity in which a beverage substrate and/or a foodstuff substrate is situated. Said substrate is preferably liquid and is in particular a concentrate, and for producing the beverage or the foodstuff is mixed with a solvent, in particular water, and then is collected in a container, in particular a glass, which preferably stands on a support plate of the device that is disposed below the mounting. The beverage substrate and/or foodstuff substrate comprises preferably liquid pre-mix component parts for soft drinks such as soda pops and juices that contain caffeine, carbon dioxide, fruit, and/or sugar, beer (mixer) beverages, or other alcoholic or non-alcoholic (mixer) beverages.

The cartridge is preferably provided so as to be substantially bottle-shaped and has in particular a cartridge neck. The cartridge is particularly preferably inserted into the cartridge mounting with the opening pointing downward, that is to say in the direction of gravity.

It is provided according to the invention that the cartridge receptacle has a first holding element and a second holding element, wherein the first holding element has the receptacle opening, and wherein the first holding element, for transferring the cartridge receptacle from the loading position to the operating position, or from the operating position to the loading position, is configured so as to be movable relative to the second holding element. The second holding element particularly preferably has a clearance which in the operating position interacts in a form-fitting and/or force-fitting manner with the first holding element. The stability of the device is advantageously further increased on account thereof, since the cartridge when being inserted into the first holding element in the loading position now is securely held along the entire circumference of the cartridge neck. The second holding element herein advantageously secures the first holding element in the operating position.

It is provided according to the invention that the second holding element has a further receptacle opening, and wherein the first and the second holding element are disposed relative to one another in such a manner that the receptacle opening and the further receptacle opening are disposed so as to be congruent and mutually offset along an axial direction. The receptacle opening and/or the further receptacle opening are particularly preferably provided so as to be circular or oval. On account of two substantially congruent ring elements being provided in such a case, said two substantially congruent ring elements particularly preferably in the operating position being disposed so as to interact in a locking manner, the stability of the device is advantageously significantly increased. This is because that in this case the cartridge along the circumference of the cartridge neck thereof is held by two elements instead of only one, as in the case, for example, of the first and the second holding element being configured so as to be U-shaped. Moreover, such an axial displacement which is preferably provided so as to be parallel with the longitudinal axis of the cartridge is more stable, and the risk of a wrong positioning, for example on account of slippage, of the cartridge is minimized.

It is provided according to the invention that the first and the second holding element in the axial direction are mutually spaced apart in the loading position, and are moved closer to one another in the operating position as compared to the loading position. The first holding element in the vertical, thus in particular the axial, direction is particularly preferably disposed above the second holding element. A stable and compact construction of the cartridge mounting is particularly advantageously implementable on account thereof.

According to one further preferred embodiment, it is provided that the first holding element comprises a ring component, and wherein the second holding element has a U-shaped convexity which is open in the direction of the ring component, wherein the first holding element in relation to the second holding element is capable of being tilted about a rotation axis. Particularly preferably, the ring component is tilted in relation to the second holding element in the loading position; the cross section of the ring component in the operating position is most particularly preferably parallel with a plane of main extent of the second holding element. On account thereof, a simple operation is enabled and at the same time a high stability is advantageously guaranteed since the cartridge is held by the ring component on the entire circumference of the cartridge neck, and at the same time a simple insertion of the cartridge by a user is enabled on account of the inclination of the ring component.

According to one further preferred embodiment, it is provided that the device has a hand lever for transferring the cartridge receptacle from the loading position to the operating position, or from the operating position to the loading position, wherein the hand lever is linked to the first and/or the second holding element. The hand lever particularly preferably interacts with a mechanism in such a manner that the cartridge receptacle in the operating position is locked, in particular in a reversible manner. On account thereof, transferring the cartridge receptacle between the positions is enabled in a particularly simple manner. Thanks to the lever, the effort in terms of force required by the user for transferring herein is minor.

According to one further preferred embodiment, it is provided that the hand lever is pivotable between a first activating position in which the cartridge receptacle is in the loading position, and a second activating position in which the cartridge receptacle is in the operating position, wherein the hand lever comprises a handle which in the first activating position at least in part encloses the cartridge receptacle. On account thereof, a particularly ergonomic ease of operation of the device is advantageously achieved. Additionally, an additional safeguard is implemented on account of the handle in part enclosing the cartridge receptacle.

BRIEF DESCRIPTION OF DRAWINGS

The invention will be explained hereunder by means of FIGS. 1 to 8. These explanations are merely exemplary and do not limit the general concept according to the invention. The explanations apply to the device according to the invention and in analogous manner to the method according to the invention. Identical parts herein are identified by the same reference signs. The individual drawings herein are numbered from left to right and from top to bottom.

In the figures.

DETAILED DESCRIPTION

Figure 1:
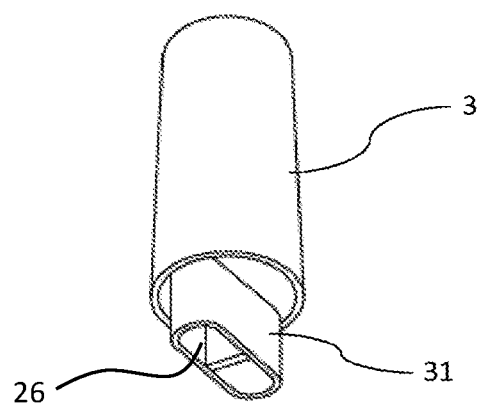
FIG. 1 shows a cartridge as is used in the device according to the invention, according to one potential embodiment of the present invention.

A cartridge 3 according to a potential embodiment of the present invention, as is used in the device according to the invention, is illustrated in FIG. 1. The cartridge 3 here is configured so as to be substantially cylindrical and at one end has a cartridge neck 31 in which an infeed, in particular for water, and a beverage outlet 26 for the finished beverage are provided. A cartridge 3 of this type herein can also have arbitrary other shapes. It is essential above all herein that the cartridge 3 can be inserted into the device and in particular that the cartridge neck 31 can interact with a cartridge mounting 1 of the device so as to be securely held. The cartridge 3 contains a beverage substance which by way of interaction with water forms a beverage.

Figure 2A:
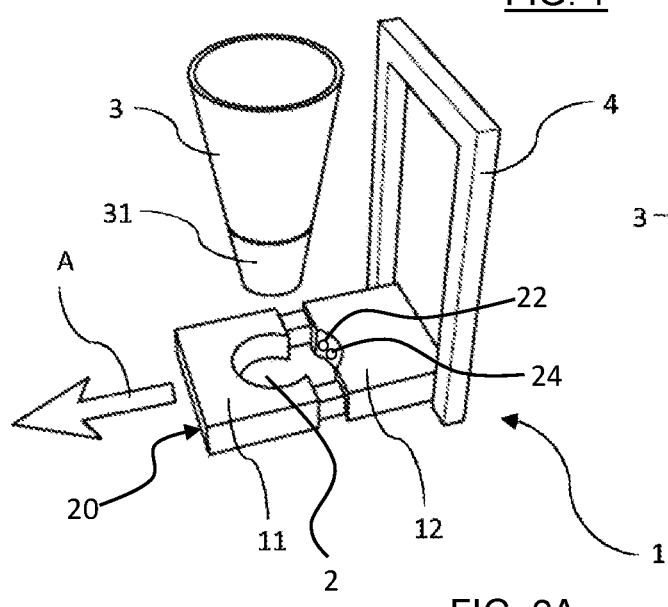
FIGS. 2A-2D show a cartridge mounting according to a first embodiment not according to the invention, when transitioning from a loading position to an operating position.

A cartridge mounting 1 according to a first embodiment not according to the invention, when transitioning from a loading position to an operating position, is illustrated in a plurality of intermediate steps in FIGS. 2A-2D. The cartridge mounting 1 illustrated herein is part of a beverage preparation device which for reasons of clarity is however not illustrated here. The beginning of the beverage preparation cycle herein is illustrated in FIG. 2A. A cartridge receptacle comprises a first holding element 11 which here has a substantially semi-circular clearance, wherein the first holding element 11 is spaced apart from a second holding element 11 which together with the first holding element 11 forms a circular receptacle opening 2 so as to transfer the cartridge mounting 1 to a loading position. To this end, said first holding element 11 is displaced along a displacement direction A which here is provided so as to be linear. The first holding element 11 and the second holding element 12 are part of a cartridge receptacle 20.

Figure 2B:
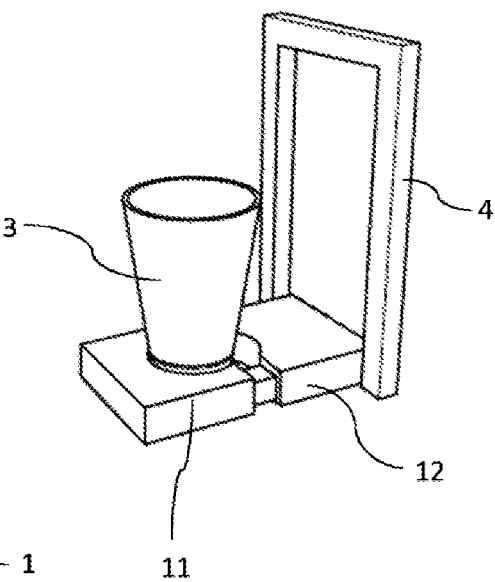

The cartridge 3 here is provided so as to be substantially frustoconical and is inserted into the clearance of the first holding element 11, where said cartridge 3 by virtue of the shape thereof and of gravity is held in a form-fitting manner. This is illustrated in FIG. 2B.

In order for a beverage to be prepared, the cartridge mounting 1 is transferred from the loading position to an operating position in which the first holding element 11 and the second holding element 12 are in mutual contact and thus present the form of a circular receptacle opening 2. The first holding element 11 and the second holding element 12 consequently comprise peripheral portions (of a circle) which when interacting hold, or fix, respectively, the cartridge 3 in its position.

Figure 2C:
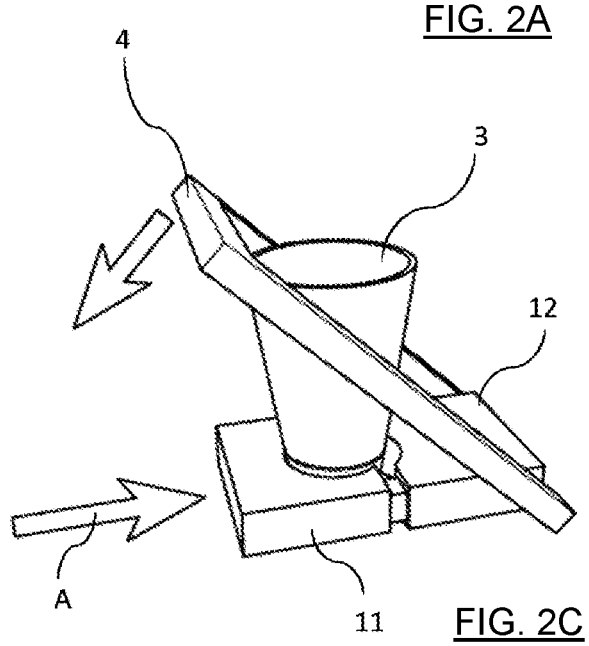

To this end, a hand lever 4 which according to the embodiment illustrated is attached to the second holding element 12 but could likewise be attached to the first holding element 11, here is transferred from a vertical position to a horizontal position. By way of a corresponding mechanism, for example a gearbox, the first holding element 11 is moved closer to the second holding element 12 on account of the movement of the hand lever 4. This is illustrated in FIG. 2C.

Figure 2D:
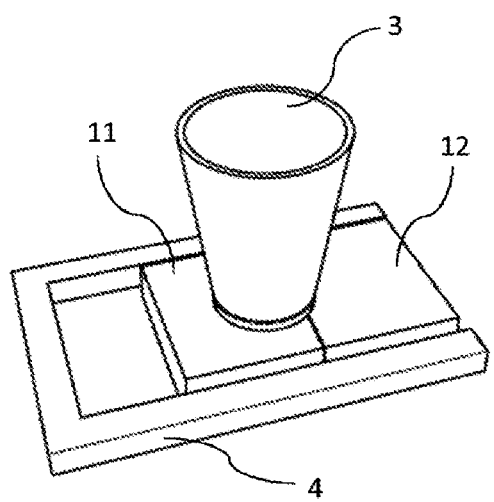
Figures 3A, 3B:
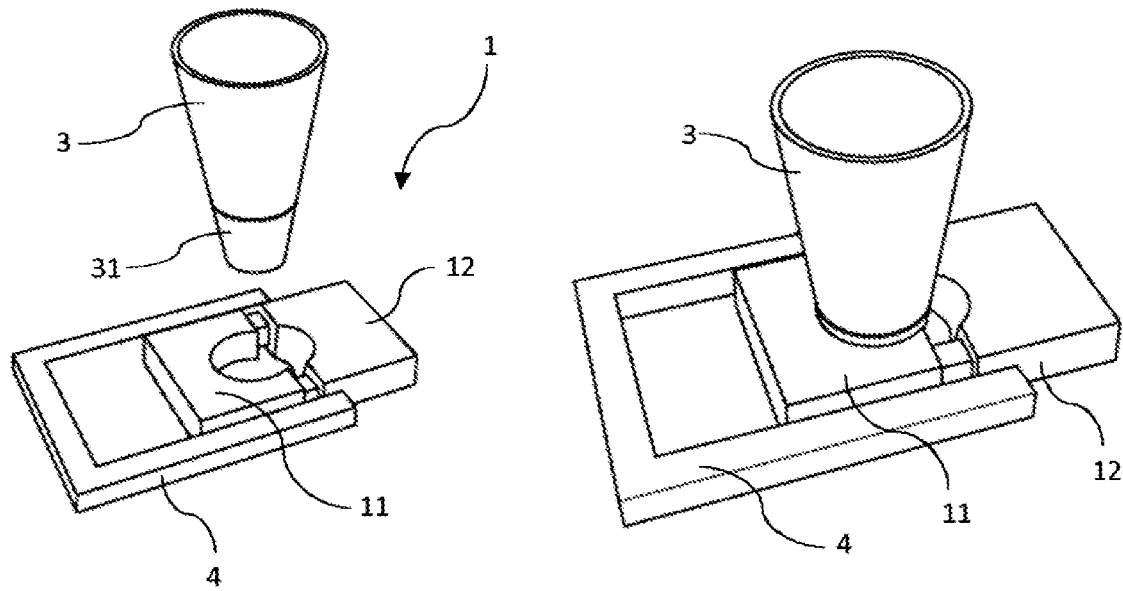
FIGS. 3A-3D show a cartridge mounting according to a second embodiment not according to the invention, when transitioning from the loading position to the operating position.
Figures 3C, 3D:
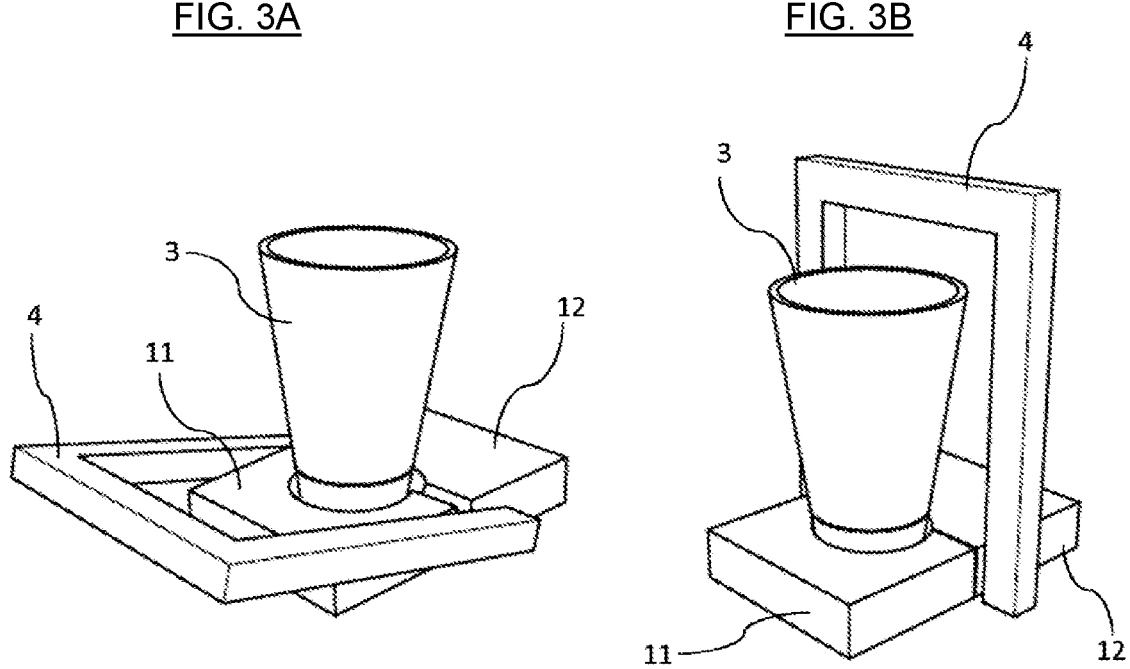
Figure 4A:
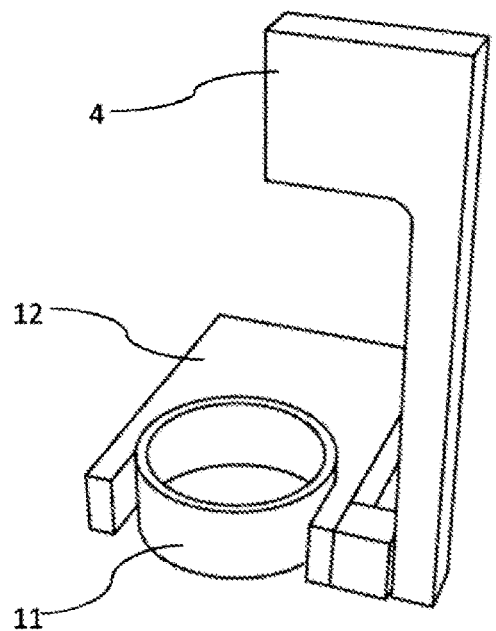
FIGS. 4A-4D show a cartridge mounting according to a third embodiment not according to the invention, when transitioning from the loading position to the operating position.
Figure 4B:
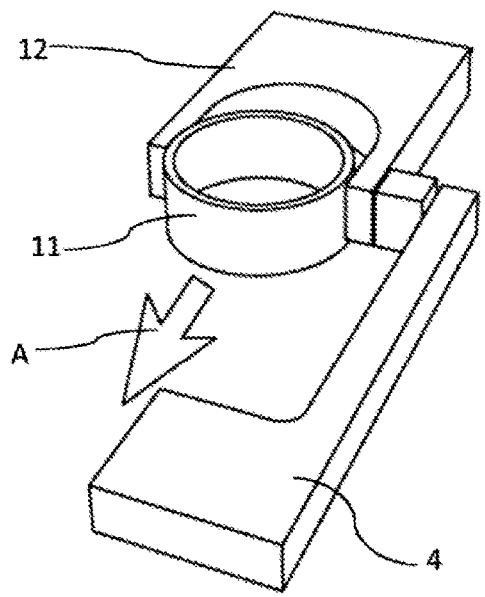
Figure 4C:
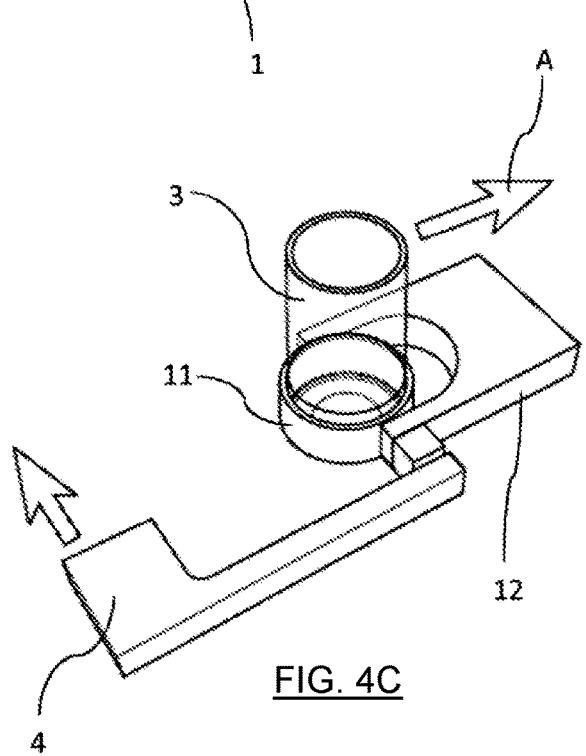
Figure 4D:
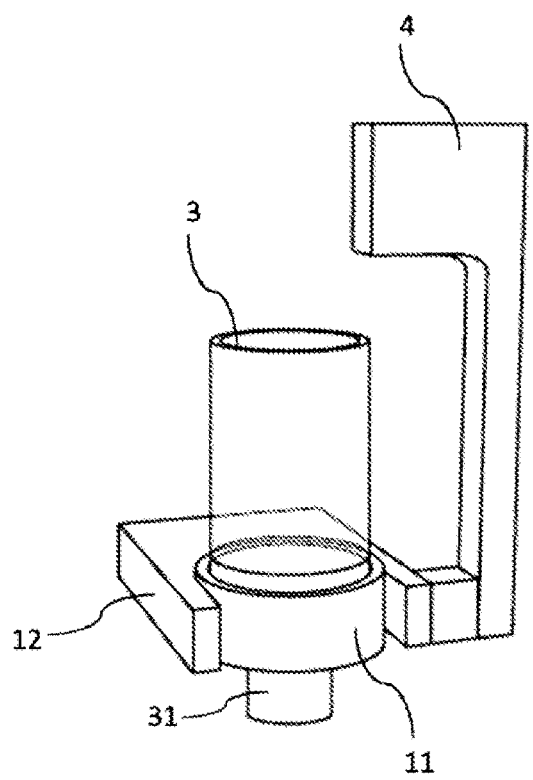
Figure 5A:
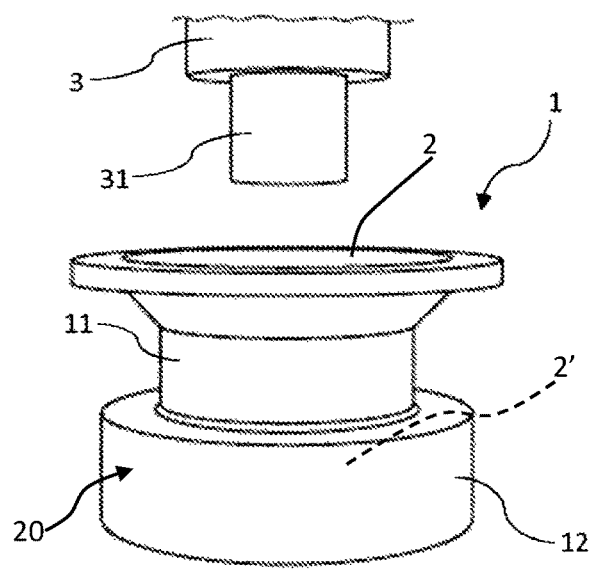
FIGS. 5A-5D show a cartridge mounting according to a fourth embodiment according to the present invention, when transitioning from the loading position to the operating position.
Figure 5B:
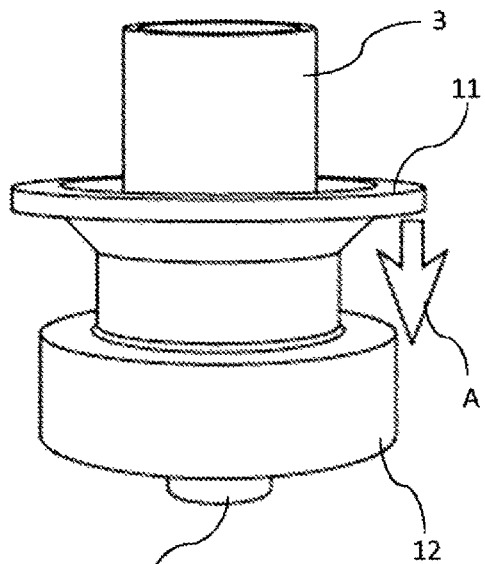
Figure 5C:
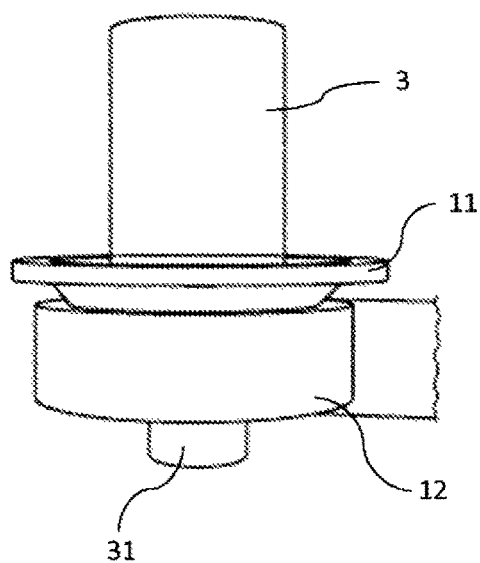
Figure 5D:
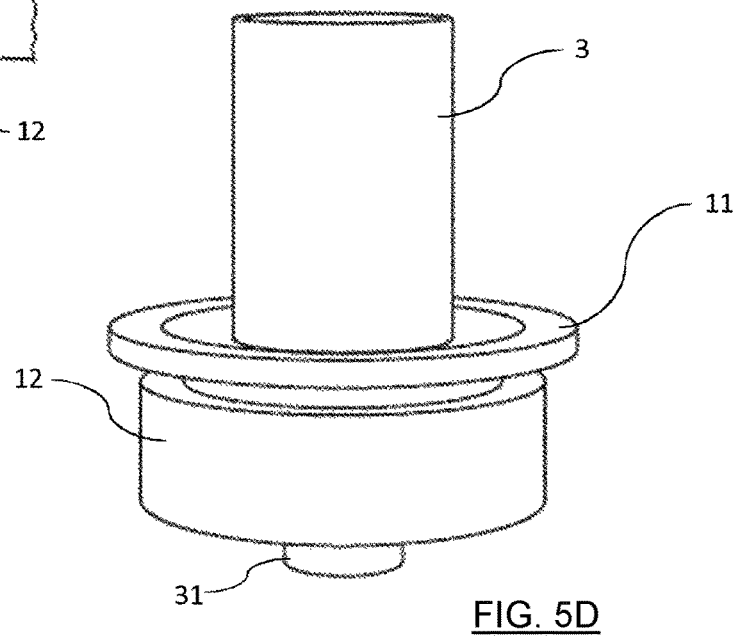
Figure 6A:
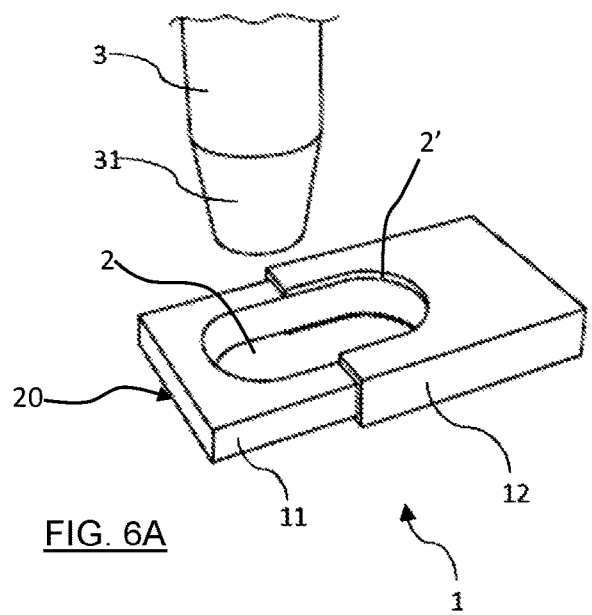
FIGS. 6A-6D show a cartridge mounting according to a fifth embodiment not according to the invention, when transitioning from the loading position to the operating position.
Figure 6B:
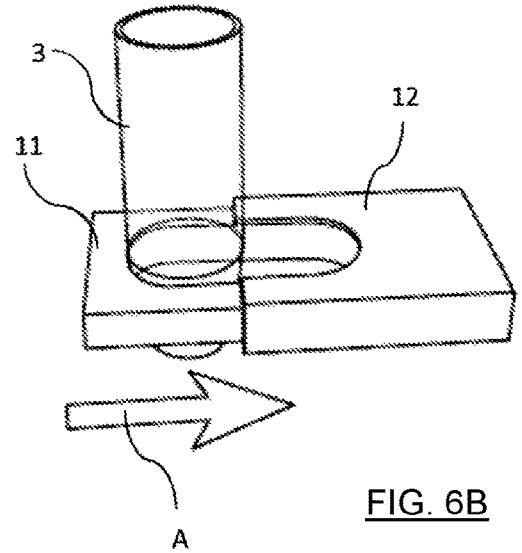
Figure 6C:
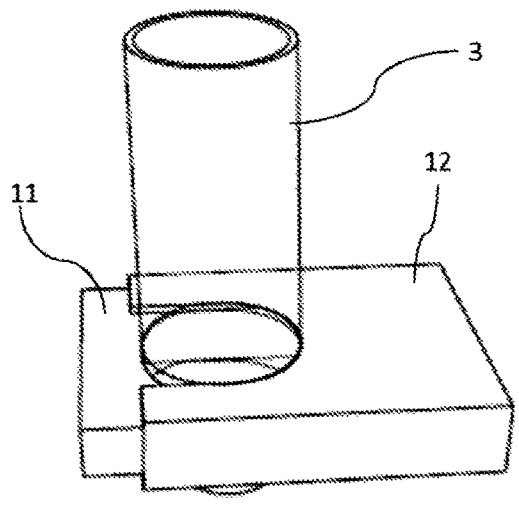
Figure 6D:
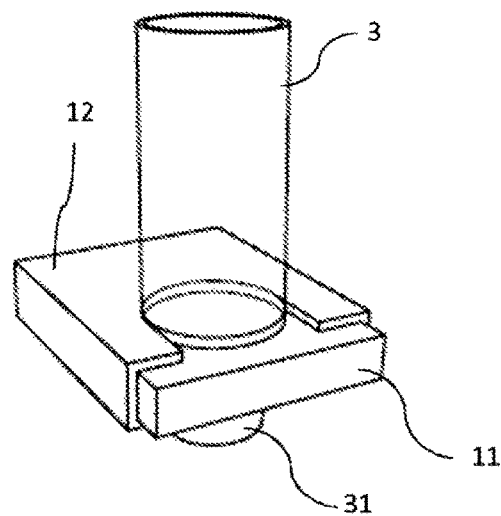
Figure 7A:
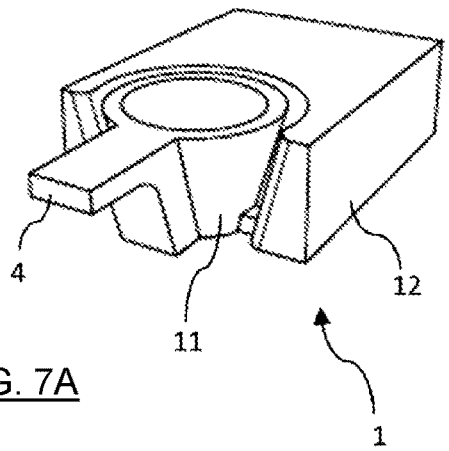
FIGS. 7A-7D show a cartridge mounting according to a sixth embodiment not according to the invention, when transitioning from the loading position to the operating position.
Figure 7B:
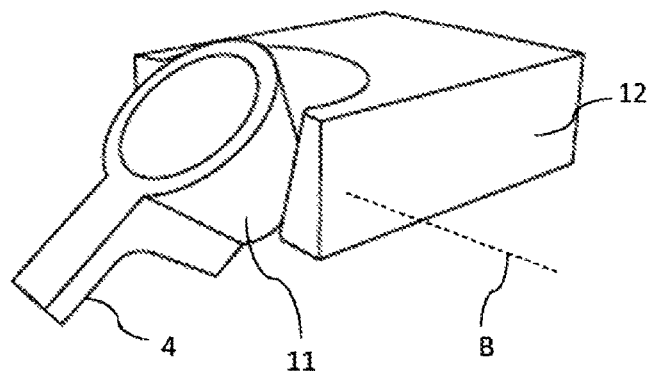
Figure 7C:
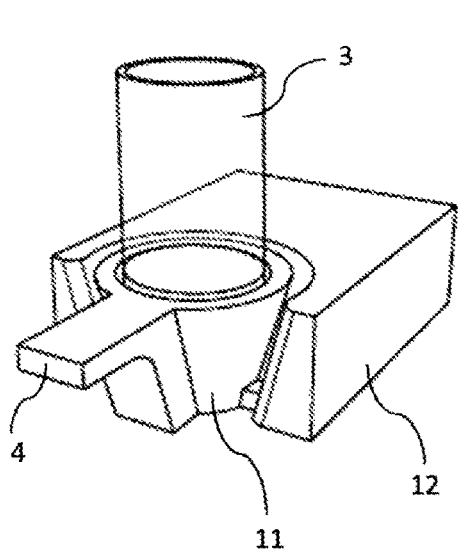
Figure 7D:
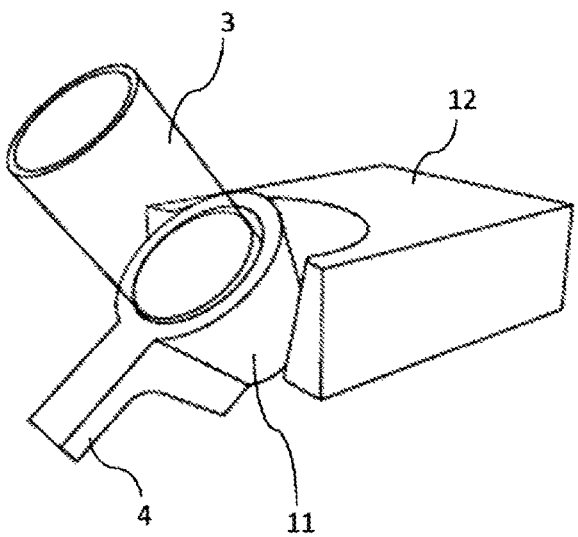
Figure 8A:
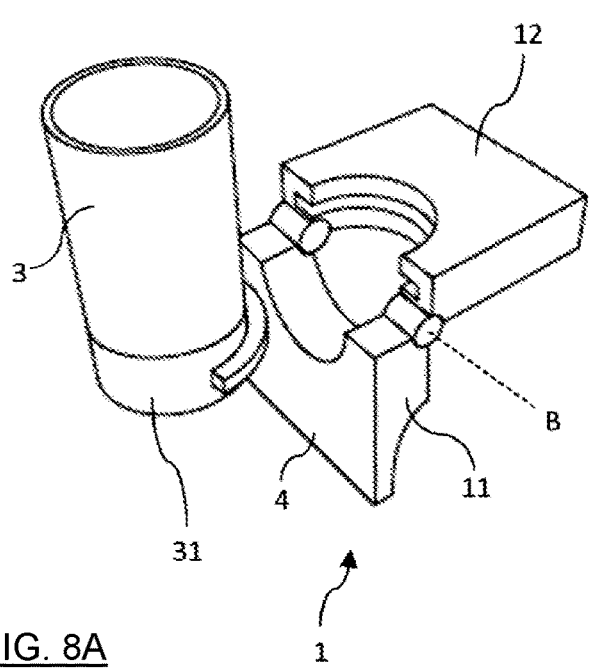
FIGS. 8A-8D show a cartridge mounting according to a seventh embodiment not according to the invention, when transitioning from the loading position to the operating position.
Figure 8B:
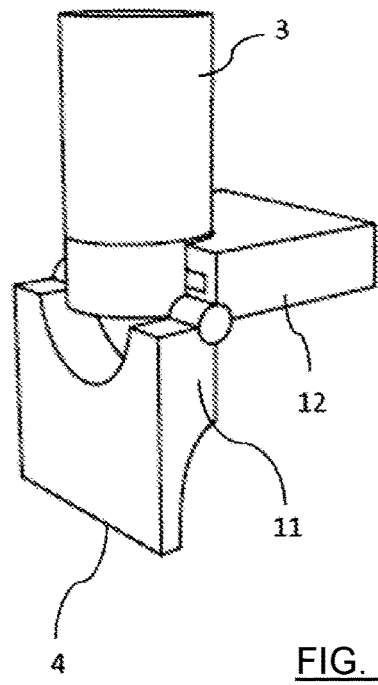
Figure 8C:
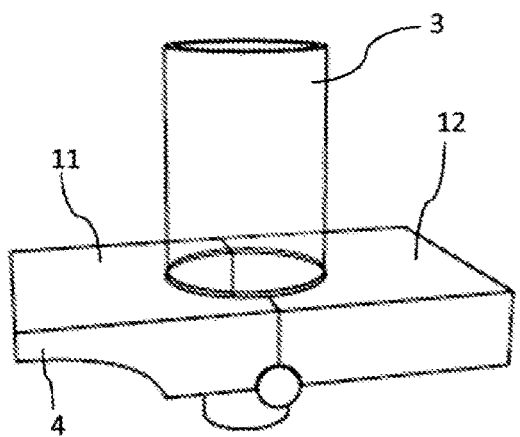
Figure 8D:
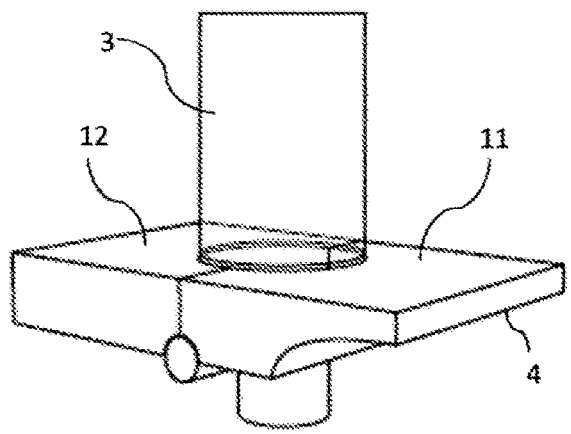

Finally, the operating position is illustrated in FIG. 2D. The cartridge 3 is securely held by the cartridge receptacle in which the cartridge neck 31 is jammed between the first and the second holding element 11, 12. The hand lever 4 is situated in a horizontal position, preferably so as to be parallel with planes of main extent of the holding elements 11, 12.

In order to prevent any unintentional opening of the cartridge receptacle, the cartridge mounting 1 can be provided in such a manner that the hand lever 4 in the operating position locks the cartridge receptacle in a reversible manner. This can take place, for example, by a knuckle joint. In order for the cartridge receptacle to be transferred from the operating position back to the loading position, the user in this case would have to move the hand lever 4 from the horizontal into the vertical position, preferably counter to an initial resistance.

The cartridge receptacle 20 has a water infeed 22 for directing water into the cartridge 3, as well as a compressed air infeed 24 for directing compressed air into the cartridge 3. The water infeed 22 and the compressed air infeed 24 herein can be disposed on the second holding element 12, for example, and/or be connected to the latter. In operation, water is directed into the cartridge 3, said water interacting with the beverage substance in the cartridge 3 and generating a beverage. The beverage is forced out of the cartridge 3 by directing compressed air into said cartridge 3, and said beverage is dispensed by way of a beverage outlet of the device into a beverage container, for example a glass or a cup.

Having completed the beverage preparation, the cartridge receptacle 20 is preferably transferred from the operating position to the loading position, and the now empty cartridge 3 is disposed of. This can take place manually or automatically.

A cartridge mounting 1 according to a second embodiment not according to the invention is illustrated when transitioning from the loading position to the operating position in FIGS. 3A to 3D. The second embodiment herein corresponds substantially to the first embodiment described in conjunction with FIGS. 1A-1D, so that reference in principle is made to the explanations pertaining thereto.

The point of differentiation lies in particular in that the hand lever 4 in the loading position now assumes a horizontal position, and for transferring the cartridge receptacle from the loading position to the operating position is moved to a vertical position in which the hand lever 4 is aligned so as to be parallel with the longitudinal axis of the cartridge 3.

The hand lever 4 herein is preferably at least in part disposed above the cartridge 3 such that the cartridge 3 cannot be removed from the cartridge mounting 1 in the operating position.

A cartridge mounting 1 according to a third embodiment not according to the invention is illustrated while transitioning from the loading position to the operating position in FIGS. 4A to 4D. In terms of the general function mode of the cartridge mounting 1 illustrated, reference is made to the preceding explanations. The differences between this embodiment and the previously described embodiments are in particular explained hereunder.

According to the third embodiment illustrated, the first holding element 11 is provided in the form of a ring construction element. The first holding element 11 thus completely encompasses the cartridge neck 31 and fixes the latter.

The ring construction element herein in the operating position is almost completely disposed in a U-shaped clearance of the second holding element 12. The ring construction element in the loading position herein, is spaced apart from the clearance along a linear displacement direction A which here is provided so as to be parallel with a plane of main extent of the second holding element 12, as has been described above.

The transfer between the loading position and the operating position, or vice versa, respectively, here too is caused by a hand lever 4 which here, by contrast to the first and the second embodiment, however is disposed only on one side of the second holding element 12. The hand lever 4 here has a wider grip so that a user can more comfortably operate the lever.

As in the second embodiment, the hand lever 4 according to the third embodiment in the operating position is vertically aligned.

The cartridge 3 is presently provided so as to be cylindrical, wherein the cartridge neck 31 has a smaller diameter. On account thereof, a shoulder by way of which the cartridge 3 can bear on the ring construction element of the first holding element 11, for example, is formed above the cartridge neck 31.

A cartridge mounting 1 according to a fourth embodiment according to the present invention is illustrated when transitioning from the loading position to the operating position in FIGS. 5A to 5D. In terms of the general functional mode of the cartridge mounting 1 illustrated, reference is made to the preceding explanations. The differences between this embodiment and the previously described embodiments are in particular explained hereunder.

According to the embodiment illustrated, the first holding element 11 as well as the second holding element 12 of the cartridge receptacle 20 are configured so as to be annular, wherein the first holding element 11 has the receptacle opening 2, and the second holding element 12 has a further receptacle opening 2'. Both holding elements 11, 12 in the loading position herein are mutually spaced apart in an axial manner, that is to say parallel with a central axis that runs through the openings. The first holding element 11 and the second holding element 12 herein can have identical diameters, in particular internal diameters, or else said first holding element 11 and said second holding element 12 can have dissimilar diameters, as is illustrated here.

However, according to this embodiment it is in any case provided that the first holding element 11 and the second holding element 12 are disposed so as to be mutually congruent. This means in particular that in the present case, in which the receptacle openings 2, 2' are provided so as to be circular, the central axes of both holding elements 11, 12 are thus identical.

In the loading position, the cartridge 3 is inserted in the axial direction into the first holding element 11. The transfer to the operating position here takes place, for example, by way of pressure on a rim-shaped flange of the first holding element 11. Alternatively or additionally, a corresponding mechanism and/or a hand lever can be used here too.

The first holding element 11 and the second holding element 12 are moved closer to one another in the operating position. The person skilled in the art understands that the operating position can be defined in particular in that the water infeed and the compressed air infeed are, in particular fluidically, connected to the infeed of the cartridge 3 and/or the beverage outlet is, in particular fluidically, connected to the outlet of the cartridge 3.

A cartridge mounting 1 according to a fifth embodiment not according to the invention when transitioning from the loading position to the operating position is illustrated in FIGS. 6A to 6D. Here too, reference is made in principle to the explanations relating in particular to the first and the second embodiment.

A transfer between the loading position and the operating position is again performed by a linear translation along a displacement direction A. The first holding element 11 and the second holding element 12 here are disposed so as to be capable of being partially displaceable into one another. The receptacle opening 2 formed by the first holding element 11 and the second holding element 12 in the loading position has the shape of an elongate hole into which the cartridge 3 is inserted.

The first holding element 11 thereupon is displaced in the direction of the second holding element 12 until the receptacle opening 2 in the operating position presently has a circular shape. The cartridge is thus secured in a form-fitting and/or force-fitting manner in relation to unintentional movement.

The transfer of the cartridge receptacle 20 between the loading position and the operating position takes place here in that a user directly displaces the first holding element 11 in the manner of a drawer. Alternatively or additionally however, it is also conceivable for a hand lever 4 to be provided for facilitating the movement, and/or for the first holding element to have a grip, for example in the form of a clearance or a recessed grip, so as to enable improved gripping by the user.

A cartridge mounting 1 according to a sixth embodiment not according to the invention when transitioning from the loading position to the operating position is illustrated in FIGS. 7A to 7D. In terms of the general functional mode of the device, reference is made to the above. The first holding element 11 in the present case has a frustoconical design having a hand lever 4 that is disposed on that side of the first holding element 11 that faces away from the second holding element 12.

The first holding element herein is connected to the second holding element 12 by way of a rotation axis B and is provided so as to be capable of being tilted relative to the second holding element 12. This is illustrated in particular in FIG. 7B. According to the embodiment illustrated, the first holding element 11 herein is in part disposed in a clearance of the second holding element 12, said clearance having a shape corresponding to that of the first holding element 11.

In order for the cartridge receptacle to be transferred to the loading position, a user grips the hand lever 4 and tilts the first holding element 11 such that the latter is disposed at an angle in relation to a plane of main extent of the second holding element 12, thus is inclined in relation to a horizontal, for example at an angle of 30°-60°, in particular at an angle of 45°.

The cartridge 3, the cartridge neck 31 thereof preferably having a shape that is adapted to the internal face of the first holding element 11, is inserted into the first holding element 11, and the cartridge receptacle is transferred to the operating position by tilting the first holding element 11.

On account of the inclined disposal of the first holding element 11 in the loading position, the cartridge 3 is capable of being comfortably inserted into the device by a user, and the first holding element 11 on account of the hand lever 4 and the tilting about the rotation axis B is capable of being transferred to the operating position in a simple manner.

Finally, a cartridge mounting 1 according to a seventh embodiment of the present invention is illustrated while transitioning from the loading position to the operating position in FIGS. 8A to 8D. The seventh embodiment herein has similarities with the first and the second embodiment respectively, and the six embodiment, which is why reference is made in principle to the respective explanations.

In a manner similar to the sixth embodiment, the first holding element 11 is likewise disposed so as to be capable of being tilted about a rotation axis B, relative to the second holding element 12. However, the first and the second holding element 11, 12 herein, in a manner similar to the first embodiment, have in each case one substantially semi-circular or U-shaped clearance such that a circular receptacle opening 2 is formed in the operating position.

The first holding element 11 in the loading position is pivoted relative to the second holding element 12 by an angle of 90°. The person skilled in the art understands that a multiplicity of further angles are also possible as long as the cartridge 3 is capable of being inserted into the cartridge mounting 1.

The cartridge neck 3 here has a partially encircling collar which is provided so as to interact in a form-fitting and/or force-fitting manner with a correspondingly shaped receptacle channel of the second holding element 12. The cartridge 3 is consequently inserted laterally into the clearance of the second holding element 12 so that the collar engages in the channel or groove.

In order for the cartridge receptacle to be transferred to the operating position, the first holding element 11 by a hand lever 4 that is integral to said first holding element 11 is pivoted upward until said first holding element 11 together with the second holding element 12 forms a continuous face, or a circular receptacle opening 2, respectively, in which the cartridge 3 is securely held. The cartridge mounting 1 preferably comprises a locking mechanism so as to prevent any unintentional pivoting of the first holding element 11 in the operating position.

After the preparation of the beverage, the first holding element 11, optionally after releasing a locking mechanism, is again pivoted downward, and the cartridge 3 is retrieved on account of a linear translation of the cartridge receptacle and subsequently is disposed of.

LIST OF REFERENCE SIGNS

1—Cartridge mounting
2—Receptacle opening
2'—Further receptacle opening
3—Cartridge
4—Hand lever
11—First holding element
12—Second holding element
20—Cartridge receptacle
22—Water infeed
24—Compressed air infeed
26—Beverage outlet
31—Cartridge neck
A—Displacement direction
B—Rotation axis

The invention claimed is:
1. A device for producing a beverage having:
a) a cartridge mounting;
b) a cartridge receptacle for receiving a cartridge filled with a beverage substance, wherein the cartridge receptacle is part of the cartridge mounting and includes:
  i) a first holding element having a first receptacle opening;
  ii) a second holding element having a second receptacle opening;
  iii) a water infeed for directing water into the cartridge; and
  iv) a compressed air infeed for directing compressed air into the cartridge;
  wherein the cartridge receptacle is capable of being transferred between a loading position and an operating position;

wherein in the loading position, the cartridge is capable of being inserted into the first receptacle opening or capable of being retrieved from the first receptacle opening;

wherein in the operating position in which, by directing the water and the compressed air into the cartridge and by the water interacting with the beverage substance, the beverage is capable of being generated in the cartridge and capable of being directed out of a beverage outlet of the cartridge;

wherein the first holding element, for transferring the cartridge receptacle from the loading position to the operating position, or from the operating position to the loading position, is configured so as to be movable relative to the second holding element;

wherein the first holding element and the second holding element are disposed so as to be mutually congruent relative to one another such that the first receptacle opening and the second receptacle opening are coaxial with one another in both the loading position and the operating position;

wherein the first receptacle opening and the second receptacle opening are offset along an axial direction when the cartridge receptacle is in the loading position; and wherein the first holding element and the second holding element in the axial direction are mutually spaced apart in the loading position and are moved closer to one another in the operating position as compared to the loading position.

2. The device as claimed in claim 1, wherein the device has a hand lever for transferring the cartridge receptacle from the loading position to the operating position, or from the operating position to the loading position; and wherein the hand lever is linked to the first holding element, the second holding element, or both the first holding element and the second holding element.

3. The device as claimed in claim 2, wherein the hand lever is pivotable between a first activating position and a second activating position;

wherein in the first activating position, the cartridge receptacle is in the loading position;

wherein in the second activating position the cartridge receptacle is in the operating position; and wherein the hand lever comprises a handle which in the first activating position at least in part encloses the cartridge receptacle.

4. A device for producing a beverage, the device having a cartridge mounting which comprises:

a cartridge receptacle for receiving a cartridge filled with a beverage substance, wherein the cartridge receptacle includes:

(i) a first holding element including a first receptacle opening;

(ii) a second holding element including a second receptacle opening;

wherein the first holding element is configured so as to be movable relative to the second holding element;

(iii) a water infeed for directing water into the cartridge;

(iv) a compressed air infeed for directing compressed air into the cartridge;

wherein the cartridge receptacle is configured to transfer between a loading position and an operating position by the first holding element moving relative to the second holding element;

wherein the first holding element and the second holding element are spaced apart in the loading position and are moved closer to one another in the operating position as compared to the loading position;

wherein the first holding element and the second holding element are disposed so as to be mutually congruent relative to one another such that the first receptacle opening and the second receptacle opening are coaxial with one another both in the loading position and the operating position;

wherein the first receptacle opening and the second receptacle opening are offset along an axial direction when the cartridge receptacle is in the loading position;

wherein in the loading position, the cartridge is capable of being inserted into the first receptacle opening or capable of being retrieved from the first receptacle opening;

wherein in the operating position, the first holding element and the second holding element are configured such that the cartridge is located within both the first receptacle and the second receptacle; and wherein in the operating position, in which by directing the water and the compressed air into the cartridge and by the water interacting with the beverage substance, the beverage is capable of being generated in the cartridge and capable of being directed out of a beverage outlet of the cartridge.

5. The device of claim 4, wherein the first receptacle opening, the second receptacle opening, or both have an ovular or circular cross-sectional shape.

6. The device of claim 4, wherein the device has a hand lever for transferring the cartridge receptacle from the loading position to the operating position, the operating position to the loading position, or both.

7. The device of claim 6, wherein the hand lever is linked to the first holding element, the second holding element, or both the first holding element and the second holding element.

8. The device of claim 6, wherein the hand lever is pivotable between a first activating position and a second activating position;

wherein in the first activating position, the cartridge receptacle is in the loading position;

wherein in the second activating position, the cartridge receptacle is in the operating position; and wherein the hand lever comprises a handle which in the first activating position, at least in part, encloses the cartridge receptacle.

9. The device of claim 4, wherein transfer between the loading position and the operating position is performed by a linear translation of the first holding element relative to the second holding element.

10. A device for producing a beverage, the device having a cartridge mounting which comprises:

(a) a cartridge receptacle for receiving a cartridge filled with a beverage substance, wherein the cartridge receptacle includes:

(i) a first holding element including a first receptacle opening;

wherein the first receptacle opening is at least partially reciprocal with a circumference of the cartridge and is configured to receive the cartridge therein;

(ii) a second holding element including a second receptacle opening;

wherein the first holding element is configured so as to be movable relative to the second holding element;

wherein the second receptacle opening is at least partially reciprocal with a circumference of a portion of the first holding element and is configured to receive the portion of the first holding element therein;

(iii) a water infeed for directing water into the cartridge;

(iv) a compressed air infeed for directing compressed air into the cartridge;

(b) a hand lever linked to the first holding element, the second holding element, or both the first holding element and the second holding element;

wherein the cartridge receptacle is configured to transfer between a loading position and an operating position by the first holding element moving relative to the second holding element;

wherein the hand lever is configured to transfer the cartridge receptacle between the loading position and the operating position;

wherein the first holding element and the second holding element are axially spaced apart in the loading position and are moved closer to one another in the operating position as compared to the loading position;

wherein in both the loading position and the operating position, the first receptacle opening and the second receptacle opening are coaxial;

wherein in the loading position, the cartridge is capable of being inserted into the first receptacle opening or capable of being retrieved from the first receptacle opening;

wherein in the operating position, the first holding element and the second holding element are configured such that the cartridge is located within both the first receptacle and the second receptacle; and wherein in the operating position, in which by directing the water and the compressed air into the cartridge and by the water interacting with the beverage substance, the beverage is capable of being generated in the cartridge and capable of being directed out of a beverage outlet of the cartridge.

11. The device of claim 10, wherein the first receptacle opening has a cross-sectional shape which is circular, or ovular; and wherein the second receptacle opening has a cross-sectional shape which is circular, or ovular.

12. The device of claim 10, wherein transfer between the loading position and the operating position is performed by a linear translation of the first holding element relative to the second holding element.

13. The device of claim 12, wherein the hand lever is pivotable between a first activating position and a second activating position;

wherein in the first activating position, the cartridge receptacle is in the loading position;

wherein in the second activating position, the cartridge receptacle is in the operating position; and wherein the hand lever comprises a handle which in the first activating position, at least in part, encloses the cartridge receptacle.

14. The device of claim 4, wherein in the operating position, the first holding element is located at least partially within the second holding element.

15. The device of claim 4, wherein the first receptacle opening and the second receptacle opening have identical internal diameters or dissimilar internal diameters.

16. The device of claim 4, wherein in the operating position, the cartridge is located within both the first receptacle opening and the second receptacle opening.

17. The device of claim 16, wherein the first receptacle opening has a shape at least partially reciprocal with a circumference of the cartridge such as to receive the cartridge therein.

18. The device of claim 17, wherein the second receptacle opening has a shape which is at least partially reciprocal with a circumference of a portion of the first holding element and is configured to receive the portion of the first holding element therein.

19. The device of claim 4, wherein the first holding element includes a rim-shaped flange about an exterior surrounding the first receptacle opening.

20. The device of claim 19, wherein the first holding element is configured such that pressure on the rim-shaped flange moves the first holding element toward the second holding element such as to move from the loading position to the operating position.

* * * * *